(12) United States Patent
Visser et al.

(10) Patent No.: US 12,215,247 B2
(45) Date of Patent: Feb. 4, 2025

(54) COATING COMPOSITION FOR REINFORCED PROTECTIVE LAYER

(71) Applicant: Akzo Nobel Coatings International B.V., Amsterdam (NL)

(72) Inventors: Peter Visser, Amsterdam (NL); Dimitri Theodoor Leon Van Agterveld, Amsterdam (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 18/726,244

(22) PCT Filed: Jan. 17, 2023

(86) PCT No.: PCT/EP2023/050988
§ 371 (c)(1),
(2) Date: Jul. 2, 2024

(87) PCT Pub. No.: WO2023/135328
PCT Pub. Date: Jul. 20, 2023

(65) Prior Publication Data
US 2024/0417587 A1 Dec. 19, 2024

(30) Foreign Application Priority Data
Jan. 17, 2022 (EP) .................................. 22151844

(51) Int. Cl.
*C09D 163/00* (2006.01)
*B05D 7/00* (2006.01)
(Continued)

(52) U.S. Cl.
CPC ............ *C09D 163/00* (2013.01); *B05D 7/16* (2013.01); *B05D 7/546* (2013.01); *C08K 3/26* (2013.01);
(Continued)

(58) Field of Classification Search
None
See application file for complete search history.

(56) References Cited

U.S. PATENT DOCUMENTS 6,013,723 A * 1/2000 Akao ................. C08L 23/04
524/568
6,139,610 A 10/2000 Sinko
(Continued)

FOREIGN PATENT DOCUMENTS

DE 102010028826 A1 11/2011
JP 58128892 A 1/1982
(Continued)

OTHER PUBLICATIONS

European Search report and search opinion.
(Continued)

*Primary Examiner* — Peter A Salamon
(74) *Attorney, Agent, or Firm* — Pauly, DeVries Smith & Deffner LLC

(57) ABSTRACT

The disclosure relates to a coating composition comprising a resin system comprising an organic film-forming resin and optionally a curing agent reactive with the organic film-forming resin, a lithium salt with a solubility in water in the range from 0.01 to 120 g/L at 20° C., selected from the group consisting of lithium carbonate, lithium phosphate, lithium bicarbonate, lithium tetraborate, and lithium oxalate, and a zinc salt of 2,5-dimercapto-1,3,4-thiadiazole (DMTD), wherein the zinc salt of DMTD is present as solid particles, the surface of which is at least partially covered by a layer of a film-formed polymer. The zinc salt of DMTD was shown to have a synergistic effect on reinforcement of barrier properties of a protective layer that is formed in a coating defect due to the presence of the lithium salt. In addition, the coating composition has an improved pot life.

14 Claims, 2 Drawing Sheets

(51) Int. Cl.
  *B05D 7/16* (2006.01)
  *C08K 3/26* (2006.01)
  *C08K 9/08* (2006.01)
  *C09D 5/00* (2006.01)
  *C09D 5/08* (2006.01)
  *C09D 7/65* (2018.01)
  *C08K 3/32* (2006.01)

(52) U.S. Cl.
  CPC ............... *C08K 9/08* (2013.01); *C09D 5/002* (2013.01); *C09D 5/084* (2013.01); *C09D 7/65* (2018.01); *B05D 2202/25* (2013.01); *B05D 2301/10* (2013.01); *B05D 2301/30* (2013.01); *B05D 2504/00* (2013.01); *C08K 2003/262* (2013.01); *C08K 2003/324* (2013.01); *C08K 2201/019* (2013.01)

(56) References Cited

U.S. PATENT DOCUMENTS

| | | | |
|---|---|---|---|
| 2004/0025581 | A1 | 12/2004 | Sinko |
| 2010/0151257 | A1* | 6/2010 | Suzuki ............... B05D 7/16 428/447 |
| 2012/0025142 | A1* | 2/2012 | Visser ............... C09D 5/10 252/389.61 |
| 2014/0031500 | A1 | 10/2014 | Kinlen |
| 2018/0162099 | A1* | 6/2018 | Furar ............... C08L 75/04 |

FOREIGN PATENT DOCUMENTS

| | | | |
|---|---|---|---|
| RU | 2727808 C2 * | 7/2020 | ............ B32B 15/08 |
| WO | WO9918044 A1 | 4/1999 | |
| WO | WO02092880 A1 | 11/2002 | |
| WO | WO2010112605 A1 | 10/2010 | |
| WO | WO2014151533 A1 | 9/2014 | |
| WO | WO2016049118 A1 | 3/2016 | |
| WO | WO2016196252 A1 | 12/2016 | |

OTHER PUBLICATIONS

International Search report and Written Opinion.
Visser P et al: Lithium salts as leachable corrosion inhibitors and potential replacement for hexavalent chromium in organic coatings for the protection of aluminum alloys, Journal of Coatings Technology and Research, Springer New York LLC, US, vol. 13, No. 4, Apr. 11, 2016, pp. 557-566.

* cited by examiner

COATING COMPOSITION FOR REINFORCED PROTECTIVE LAYER

CROSS REFERENCE TO RELATED APPLICATION

This application is a 35 U.S.C. § 371 national phase application of PCT Application No. PCT/EP2023/050988 (published as WO/2023/135328), filed Jan. 17, 2023, which claims the benefit of priority to EP application Ser. No. 22/151,844.2, filed on Jan. 17, 2022, each of which is incorporated herein by reference in its entirety.

FIELD OF THE TECHNOLOGY

The present disclosure relates to a coating composition with protective properties, particularly useful for metal substrates.

BACKGROUND

Protective coatings are widely used to protect substrates, particularly metal substrates from corrosion. Hexavalent chromium compounds have long been in use as corrosion inhibitors in protective coatings and conversion coatings for metal surfaces. However, hexavalent chromium is toxic and is therefore due to be phased out for environmental, worker safety, and regulatory reasons. Alternative, chrome-free inhibitors have been proposed in the recent years however many formulations especially struggle to meet the industrial corrosion resistance standards.

While much progress is made in chrome replacement in anti-corrosive coatings, there is still a desire to provide Cr-free coatings with improved and long-term corrosion resistance properties comparable to or better than that of conventional Cr-containing coatings.

Recently, coating compositions with lithium salts have been proposed as alternative to Cr-containing coatings. See for example Visser, P., Liu, Y., Terryn, H. et al. "Lithium salts as leachable corrosion inhibitors and potential replacement for hexavalent chromium in organic coatings for the protection of aluminum alloys." *J Coat Technol Res* 13, 557-566 (2016). As described in this article, coating compositions with lithium salts have demonstrated to have anti-corrosive activity due to the formation of a protective layer on bare metal at locations where the coating deposited from the coating composition with lithium salts has a defect. Such a layer was found to contain aluminum, oxygen and also lithium that leached out from the coating. The protective layer provides a barrier between the metal surface in the coating defect and the corrosive environment. This barrier function and the strength of this protective layer may be important for long-term protection. Insufficient barrier function or a lower strength of the protective layer formed can result in local metal defects and corrosion.

It is desired to provide coating compositions with improved barrier properties. In addition, it is desired to provide coating compositions with an improved pot life and minimum of side reactions occurring during the open time.

SUMMARY

It has been found that a protective layer formed in a coating defect due to the action of a lithium salt shows a significantly higher barrier function, as observed by electrochemical impedance spectroscopy (EIS), if the coating composition also contains a zinc salt of 2,5-dimercapto-1,3,4-thiadiazole (DMTD). The zinc salt of DMTD acts as a reinforcement agent for the barrier function of the protective layer formed on the exposed metal surface. However, when a zinc salt of DMTD is used in coating compositions, its activity may be diminished due to reactivity with coating components, e.g., epoxy resins, which in turn can negatively influence the pot life of the coating composition.

In the present disclosure, the reinforcement agent is provided in a surface-modified form that allows both to preserve its reinforcement activity and prevent its reaction with coating components.

Hence the present disclosure provides, in a first aspect, a coating composition comprising:
a) a resin system comprising an organic film-forming resin and optionally a curing agent reactive with the organic film-forming resin,
b) a lithium salt with a solubility in water in the range from 0.01 to 120 g/L at 20° C., selected from the group consisting of lithium carbonate, lithium phosphate, lithium bicarbonate, lithium tetraborate, and lithium oxalate, and
c) a zinc salt of 2,5-dimercapto-1,3,4-thiadiazole (DMTD), wherein the zinc salt of DMTD is 2,5-dimercapto-1,3,4-thiadiazole zinc salt (VII),
wherein the zinc salt of DMTD is present as solid particles, the surface of which is at least partially covered by a layer of a film-formed polymer.

In another aspect, the disclosure provides a method for coating a metal substrate comprising the steps of:
a) applying the coating composition according to the present disclosure to the metal substrate, and
b) curing the applied coating composition.

In a further aspect, the disclosure also provides a metal substrate coated with the coating composition according to the disclosure.

DETAILED DESCRIPTION

Figure 1:
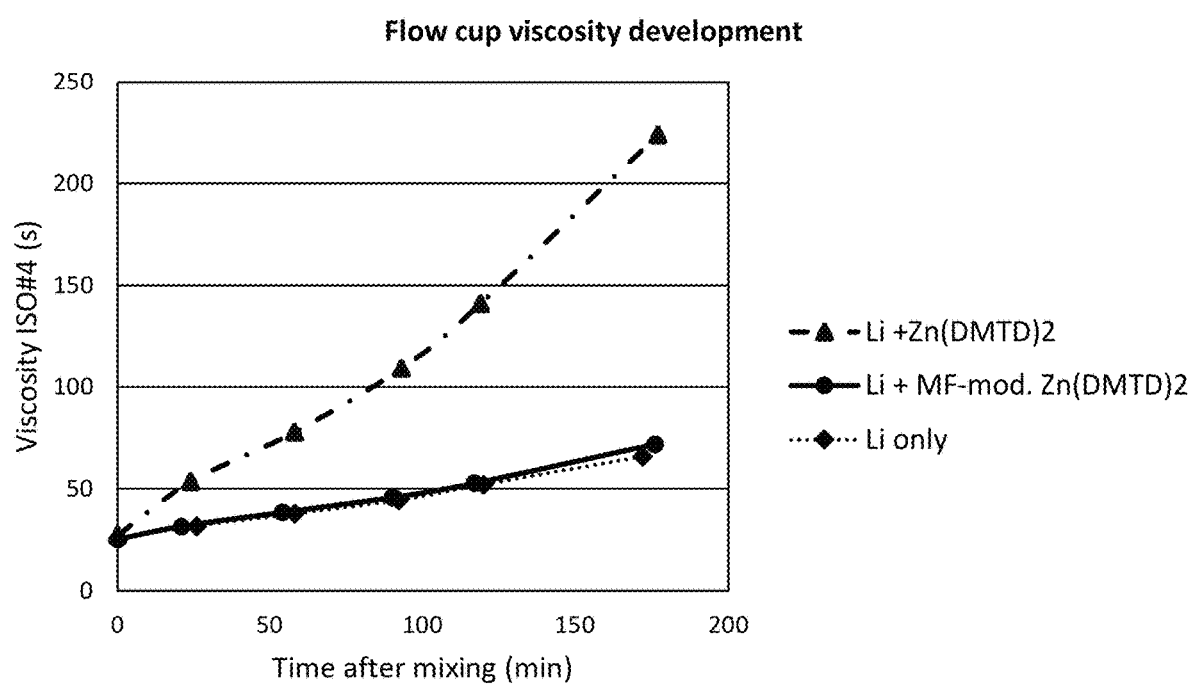
FIGS. 1 and 2 show flow cup viscosity development in time after mixing for some embodiments of the present disclosure and for comparative coating compositions.

It has been surprisingly found that the use of a zinc salt of DMTD reinforces the protective layer formed by lithium ions on the metal surface in a coating defect, when used together with a lithium salt selected from the group consisting of lithium carbonate, lithium phosphate, lithium bicarbonate, lithium tetraborate, and lithium oxalate in a coating composition. The formation of a protective layer by lithium ions has been previously shown to be the mechanism of the anti-corrosive working of lithium salts. When a coating defect is formed in a cured coating so that the metal substrate becomes exposed and prone to corrosion, lithium ions leach out of the coating to the metal surface and contribute to the formation of a protective layer on the surface. The presence of such a protective layer can be observed and its barrier properties can be quantified using electrochemical impedance spectroscopy (EIS). See Visser, P., Liu, Y., Terryn, H. et al. "Lithium salts as leachable corrosion inhibitors and potential replacement for hexavalent chromium in organic coatings for the protection of aluminum alloys." *J Coat Technol Res* 13, 557-566 (2016). This electrochemical method allows to quantify the barrier properties of the protective layer in the damaged area (scribe) generated by the active protective mechanism (leaching) of the coating after exposure to an accelerated corrosion test (e.g., neutral salt spray exposure).

The magnitude of the barrier function is derived from the electrochemical impedance spectra. The impedance modulus plots show the impedance modulus ($\Omega$ cm$^2$) as a function of the frequency range (Hz). The increase of the impedance modulus in the middle frequency range 10 Hz can be associated with the formation of a protective layer in the damaged area (scribe). The increase of the impedance modulus at low frequencies (10 mHz) can be associated with the suppression of the corrosion processes at the substrate. An important advantage of using EIS is that it makes it possible to quantify the differences between coating formulations which cannot be observed or quantified with visual methods.

However, the use of a zinc salt of DMTD in coating compositions is not straight-forward, because of active thiol groups of the DMTD molecule, which can be reactive towards the other coating components. In the present disclosure, the reinforcement agent is provided in an encapsulated form (covered with a layer of film-formed polymer), which allows both to preserve its activity and prevent its reaction with the coating components.

In the present disclosure the zinc salt of DMTD is present as solid particles, the surface of which is at least partially covered by a layer of a film-formed polymer. The surface can be covered by the film-formed polymer layer partially or completely, which can be observed, e.g., by microscope. Preferably, the surface is at least 80% covered, more preferably at least 90%, yet more preferably at least 95%, which can be estimated from a representative number of microscope images.

Reference herein to a "film-formed polymer" is to a polymer that has already formed a film (often referred to as 'cured') and will not form a film anymore upon heating, drying or contact with a curing agent.

The coating composition according to the present disclosure is preferably chrome-free. "Chrome-free" means that it is free of any Cr compounds, particularly from Cr(VI) compounds such as chromates.

The coating composition according to the present disclosure comprises a) a resin system comprising an organic film-forming resin and optionally a curing agent reactive with the organic film-forming resin. Within the specification, the term "film-forming resin" includes polymers, but also monomers or oligomers, which during curing of the coating form a polymeric system. Organic film-forming resin means that the polymers, monomers or oligomers are of organic nature (carbon-containing compounds). The coating composition is preferably free of polysiloxanes. The coating composition is preferably not a sol-gel composition.

The film-forming resin can be selected from, e.g., epoxy resins, hydroxy-functional resins (like polyesters and poly(meth)acrylates), resins with one or more blocked hydroxyl groups (like acetals), oxazolidine resins, carboxylic-acid functional resins), polyacrylates, polyurethanes, polyethers, polyaspartic esters, (blocked) isocyanates, thiol-functional resins, amine-functional resins, amide-functional resins, imide-functional resins (e.g. maleimide), alkyd resins, resins containing at least one olefinically unsaturated bond, silane-containing resins, polysiloxane resins, acetoacetate resins, functional (curable) fluorinated resins, and mixtures and hybrids thereof.

The disclosure is particularly beneficial for the embodiments, wherein the film-forming resin comprises an epoxy resin. Epoxy resins are epoxy functional polymers with an epoxy equivalency greater than one and usually about two. Most commonly used epoxy resins are polyglycidyl ethers of cyclic polyols, such as Bisphenol A, resorcinol, hydroquinone and catechol, or polyglycidyl ethers of polyols such as 1,2-cyclohexane diol, 1,4-cyclohexane diol, 1,2-bis(hydroxymethyl)cyclohexane.

The film-forming resin is preferably present in the coating composition according to the present disclosure in an amount of 1-99 wt. %, more preferably 10-90 wt. %, yet more preferably 20-80 wt. %, based on the total weight of the non-volatile components of the coating composition.

The coating composition may contain a curing agent reactive with the film-forming resin. The curing agent comprises functional groups that are reactive to the functional groups of the resin. The type of the curing agent depends on the nature of the film-forming resin. Suitable curing agents for a specific film-forming resin is common knowledge for a person skilled in the art.

Epoxy resin-containing compositions preferably contain an aliphatic or aromatic amine curing agent, a polyamide curing agent, or a thiol-based curing agent. More preferably, the curing agent comprises an amine-functional compound. Suitable epoxy resins are Bisphenol A, Bisphenol F, Bisphenol A/F, Novolac and aliphatic epoxy resins, for example Epikote 828 from Hexion Europe BV. Suitable amine curing agents are aliphatic amines and adducts thereof (e.g., Ancamine® 2021, Ancamine® 2500), phenalkamines, cycloaliphatic amines (e.g. Ancamine® 2196), amido amines (e.g. Ancamide® 2426), polyamides and adducts thereof, and mixtures thereof. Particularly preferred are melamine resins, preferably methylated melamine resins such as hexamethoxymethyl melamine (HMMM), commercially available e.g., as Cymel® 350 from Allnex.

The epoxy/NH molar ratio in epoxy-amine type coating compositions is preferably in the range 0.6 to 2.0, more preferably 0.8 to 1.7. For solvent-borne epoxy-amine coating compositions, the epoxy/NH molar ratio is preferably 0.6 to 1.4, more preferably 0.8 to 1.2, and most preferably in the range 0.85 to 1.1.

The coating composition can be a one-component or two-component (2K) composition, or even a composition with more than two components. Preferably, the composition is a 2K composition. 2K coating compositions consist of two components, which are stored separately and are mixed shortly before the application to a substrate. Typically, the first component would comprise the organic film-forming resin and the second component the curing agent.

The coating composition according to the present disclosure comprises a lithium salt with a limited solubility in water.

The lithium salt has a solubility in water of at least 0.01, preferably 0.05, more preferably at least 0.1 g/L measured in water at 20° C. Lithium salts with a solubility of at least 0.5, more preferably at least 1, yet more preferably at least 5 g/L show particularly good results. Lithium salts with a solubility of below 0.01 g/L do not show enough activity. The solubility of the lithium salt is below 120 g/L, preferably below 100 g/L, more preferably below 85 g/L. A too high solubility can lead to problems in formulation of the coating composition, e.g., inhomogeneous coating composition, which can lead to problems in application. The lithium salt has a solubility in the range 0.01-120 g/L measured in water at 20° C. The solubility is preferably in the range of 1-100 g/L. Solubility in water is measured according to OECD Guideline No. 105, EU method A.6 (flask method, Procedure § 23), which describes preparation of a saturated solution, after which the concentration in the solution is measured with a suitable analytical method. A suitable analytical method for determining the concentration of relevant ions is known to the skilled person and can be chosen depending on the ion. Particularly, for lithium salts, the method of inductively coupled plasma mass spectrometry (ICP-OES) is used.

The lithium salt is selected from the group consisting of lithium carbonate, lithium phosphate, lithium bicarbonate, lithium tetraborate, and lithium oxalate. Reference herein to phosphate is to orthophosphate, unless indicated otherwise. Solubility in water of lithium carbonate is 13 g/L, lithium phosphate 0.39 g/L, lithium oxalate 62 g/L, lithium tetraborate 28 g/L, all at 20° C. Preferably, the lithium salt is selected from the group consisting of lithium carbonate, lithium phosphate, lithium oxalate, and any mixture of two or more thereof. In some embodiments, lithium carbonate is the preferred salt. It can be used alone or in mixture with other lithium salts, e.g., lithium carbonate and lithium phosphate. In other embodiments, lithium phosphate can be preferred.

It is preferred that the coating composition is free of lithium salts with a solubility lower than 0.01 g/L at 20° C. In other embodiments, it is preferred that the coating composition is free of lithium salts with a solubility in water higher than 120 g/L at 20° C., for example lithium chloride or lithium nitrate. Preferably, the coating composition is free of any lithium salts other than lithium carbonate, lithium phosphate, lithium bicarbonate, lithium tetraborate, and lithium oxalate.

For the best results, the lithium salt selected from the group consisting of lithium carbonate, lithium phosphate, lithium bicarbonate, lithium tetraborate, and lithium oxalate is preferably present in the coating composition in an amount of at least 1.3 wt. % of lithium, more preferably at least 1.6 wt. %, yet more preferably at least 2 wt. %, more preferably at least 2.5 wt. %, even more preferably at least 3 wt. % of lithium, based on solid weight of the resin system. "Solid weight of the resin system" refers to the total dry weight of the resin system, that is, all film-forming resins and, if present, curing agents in the coating composition. The amount of the lithium salt selected from the group consisting of lithium carbonate, lithium phosphate, lithium bicarbonate, lithium tetraborate, and lithium oxalate in the coating composition is such that the weight of lithium is preferably in the range from 1.3 to 40 wt. %, based on solid weight of the resin system. The coating composition preferably does not comprise more than 40 wt. %, or more than 30 wt. %, or more than 25 wt. %, or more than 20 wt. %, or more than 15 wt. %, or more than 10 wt. % of lithium based on solid weight of the resin system. Below 1.3 wt. % of lithium the reinforcement of the protective layer may be insufficient, especially when lithium carbonate is used as the lithium salt. As for the upper limit, it may be impractical to include more of lithium in the composition due to costs and because the effects are already achieved at lower concentrations. If the lithium salt is lithium phosphate, the lithium phosphate is preferably present in an amount of at least 2.0 wt. % of lithium based on solid weight of the resin system, more preferably at least 3.0 wt. %, even more preferably at least 4.0 wt %, still more preferably at least 5.0 wt %.

The coating composition further comprises a zinc salt of 2,5-dimercapto-1,3,4-thiadiazole (DMTD).

The zinc salt of DMTD is 2,5-dimercapto-1,3,4-thiadiazole zinc salt (VII) (CAS 63813-27-4), which is a 1:2 salt of Zn and DMTD. Description "1:2 salt" means here that it is formed from 1 mole of Zn and 2 moles of DMTD. The salt is further herein referred to as $Zn(DMTD)_2$ or "the zinc salt of DMTD". The zinc salt of DMTD can be obtained by known methods, e.g., by reacting ZnO and DMTD as described in Example 1 of WO 02/092880. The zinc salt of DMTD is commercially available, e.g., as part of Inhibicor 1000 from WPC Technologies. The solubility of $Zn(DMTD)_2$ in water has been reported to be 0.4 g/L at 24° C.

In some embodiments, the zinc salt of DMTD is present in the coating composition in the absence of further zinc-containing compounds, such as zinc oxide and/or zinc salts, for example zinc orthophosphate or zinc cyanamide ($CH_2N_2Zn$). Particularly, the coating composition is free of any of ZnO, zinc orthophosphate, zinc cyanamide or any combination of these. In some embodiments, the coating composition is free of ZnO. In some embodiments, the coating composition is free of zinc orthophosphate. In yet other embodiments, the coating composition is free of zinc cyanamide. In some embodiments, the composition is free of ZnO, zinc orthophosphate and zinc cyanamide. Without wishing to be bound by any theory, it is believed that solely $Zn(DMTD)_2$ is responsible for reinforcing the barrier properties of the protective layer formed by the lithium ions in the lithium salt and therefore the presence of other Zn compounds is not necessary.

In other embodiments, however, it can be beneficial that the coating composition comprises further zinc-containing compounds, such as any of ZnO, zinc orthophosphate, zinc cyanamide or any combination of these. Examples of combinations are $Zn(DMTD)_2$ with ZnO, or $Zn(DMTD)_2$ with zinc orthophosphate, or $Zn(DMTD)_2$ with zinc cyanamide. If $Zn(DMTD)_2$ is present in combination with further zinc compounds, the amount of $Zn(DMTD)_2$ is from 1 to 99 wt. %, preferably from 10-98 wt. %, more preferably from 20 to 95 wt. %, most preferably from 30 to 90 wt. %, based on the total weight of zinc compounds.

In some embodiments, the content of $Zn(DMTD)_2$ in a mixture with other zinc compounds may be higher than 50 wt. %, preferably higher than 60 wt. %, more preferably higher than 70, most preferably higher than 80 wt. %, more preferably higher than 90 wt. % based on the solid weight of the mixture. An example of suitable mixture would be 1-30 wt. % Zn orthophosphate, 1-20 wt. % ZnO, and at least 50 wt. % $Zn(DMTD)_2$, such as 50-98 wt. % based on the solid weight of the mixture. Much lower content of $Zn(DMTD)_2$ in the Zn compounds mixture may lead to insufficient protective working, especially if the DMTD content in the coating composition is lower than 0.05 wt. % on solid weight of the resin system.

In some embodiments, $Zn(DTMD)_2$ is present in combination with other zinc compounds such as any of ZnO, zinc orthophosphate, zinc cyanamide or any combination of these, wherein the amount of $Zn(DTMD)_2$ in said mixture is higher than 50 wt. % based on the solid weight of the mixture, preferably higher than 60 wt. %, more preferably higher than 80 wt. % and most preferably higher than 90 wt. %, and wherein the DMTD content in the coating composition is at least 0.05 wt. % on solid weight of the resin system, preferably at least 1 wt. %, more preferably at least 2 wt. %.

Preferably, the zinc salt of DMTD is present in the coating composition so as to provide least 0.05 wt. % of DMTD, more preferably at least 0.1 wt. %, yet more preferably at least 0.4 wt. %, or at least 0.6 wt. %, or at least 1 wt. %, more preferably at least 2 wt. % or at least 4 wt. % of DMTD on solid weight of the resin system. Preferably, the amount is lower than 50 wt. %, or lower than 40 wt. %, or lower than 30 wt. %, or 20 wt. % DMTD on solid weight of the resin system. When used in amounts lower than 0.05 wt. % the synergistic action with lithium is believed to be too low in order to provide any benefit in practice. Using amounts higher than 50 wt. % is believed impractical, e.g. due to potential formulation issues or high cost.

The coating composition preferably contains the lithium salt and the zinc salt of DMTD in such amounts that the weight ratio of lithium to DMTD is from 0.01 to 20, preferably from 0.1 to 10, calculated as the weight ratio of lithium content to DMTD content. In some embodiments, it can be preferred that the content of DMTD (present as a zinc salt of DMTD) is equal to or higher than the content of lithium (present as a lithium salt). In other embodiments, it can be preferred that the content of DMTD (present as a zinc salt of DMTD) is equal to or lower than the content of lithium (present as a lithium salt).

According to the present disclosure, the zinc salt of DMTD is present as solid particles, the surface of which is at least partially covered by a layer of a film-formed polymer. In this way, the zinc salt of DMTD is encapsulated by the polymer. While many polymers for encapsulation can be used, some of them are better suitable. For example, on one hand, the polymer layer needs to shield the reinforcing agent (the zinc salt of DMTD) from coating ingredients to which it can be reactive. At the same time, the activity of the reinforcing agent in the coating needs to be maintained after encapsulation. Without wishing to be bound by particular theory, it is believed that this activity is based on leaching of the lithium salt and the zinc salt of DMTD from the coating onto the metal substrate in a coating defect. Therefore, the encapsulating polymer matrix needs to allow the zinc salt of DMTD to leach out from the coating to exercise its reinforcing effect, while protecting the zinc salt from certain coating ingredients at the same time.

The polymer layer can contain one or more film-formed polymers. The polymer can be organic or inorganic. The best results were achieved with melamine-formaldehyde, urea-formaldehyde and silica sol-gel based encapsulation. The most preferred film-formed polymer for encapsulation is melamine-formaldehyde.

Encapsulation in silica microcapsules via a sol-gel reaction of a silica precursor is commonly known. The process involves a reaction of a silane and an alkoxy orthosilicate in the presence of the compound to be encapsulated. Preferred silanes include epoxy-functional alkoxysilanes such as Dynasilan Glymo, which is bifunctional 3-glycidyloxypropyltrimethoxysilane from Evonik Industries. Suitable alkoxy orthosilicate is for example tetraethoxy orthosilicate (TEOS).

Melamine-formaldehyde encapsulation is done by polycondensation of the melamine-formaldehyde monomers in the presence of the encapsulated compound. The condensation is brought about by lowering the pH and is preferably done in the presence of a surfactant. As a surfactant, any suitable, preferably, polymeric surfactant is used. Preferably, poly(ethylene-alt-maleic anhydride) (polyEMA) is used. The surfactant can be used as a solution in a suitable solvent, e.g., in water. The surfactant is preferably used in an amount from 0.01 to 20 wt. %, more preferably from 0.1 to 10 wt. % on the solids of the metal salt of DMTD. Higher amounts of surfactant may necessitate a washing step of the encapsulated material. As a result of the encapsulation, the particles are at least partially covered with a layer of film-formed poly(melamine-formaldehyde).

If it is desired to lower the free formaldehyde level in the encapsulating polymer, it is possible to use a formaldehyde scavenger. Particularly preferred formaldehyde scavenger is ammonium chloride.

The solid particles that are covered by the polymer layer can also comprise other Zn-containing compounds, such as Zn oxide and other Zn salts.

In some embodiments, the solid particles can comprise the zinc salt of DMTD as part of a hybrid compound, and in such cases, it is preferably encapsulated as a whole. Reference herein to a hybrid compound (sometimes referred to as a hybrid pigment) is to an inseparable, intimate blend of two or more solid compounds comprising both organic and inorganic compounds, typically formed by co-precipitation. Examples of hybrid compounds include host-guest compounds, wherein the host matrix is inorganic and has a layered structure and the guest compound is organic. In some embodiments, however, it is preferred that the zinc salt of DMTD does not form part of a hybrid pigment.

It has been discovered that the combination of a lithium salt with a zinc salt of DMTD in an organic coating shows unexpected reinforcement of barrier properties of a protective layer that is formed on the exposed metal substrate. The protective layer is formed at the location where a coating defect occurs, which is simulated in the examples by scribes through the coating to expose the bare metal to the environment. Unlike other well-known corrosion inhibitors, lithium salts are known to form an irreversible protective layer on a metal substrate (e.g., aluminium alloy) through the mechanism of leaching from the coating. The protective layer provides a barrier between the metal substrate and the environment. The barrier function by this layer cannot be observed visually but can be measured using electrochemical impedance spectroscopy (EIS). The presence of $Zn(DMTD)_2$ in a coating composition together with a lithium salt and an organic film-forming resin results in much higher impedance values for the protective layer than in cases when only a lithium salt is used, or where the lithium salt is used together with other screened potentially active compounds. Higher impedance values mean that the protective layer has a higher barrier function or is "reinforced". Higher barrier function means here higher impedance modulus values (0 $cm^2$) for the same frequency range (Hz) and particularly, higher impedance modulus values for the frequencies of 10 Hz and 10 mHz as measured by EIS. A reinforced protective layer can lead to improved or longer protection. This reinforcement of the protective layer is unexpected because $Zn(DMTD)_2$ does not exhibit barrier properties or protective layer formation itself, as shown by the examples below.

Further, it has also been discovered and demonstrated in the examples that the encapsulation of the zinc salt of DMTD in a film-formed polymer layer helps to prolong the pot life of the coating composition, which otherwise would be short and in some cases even too short for practical use. Preferably, the pot life is in the range from 1 to 8 hours, more preferably between 2 and 8 hours. Longer pot life is generally also acceptable. Less than 30 minutes is generally not acceptable. At the same time, it is important that the activity of the zinc salt of DMTD as a reinforcing agent is still preserved after encapsulation, as supported by higher impedance values in the EIS measurements in the examples.

The coating composition can further comprise at least one magnesium compound. Suitable magnesium compounds are for example magnesium-containing materials, such as magnesium metal, magnesium oxide, oxyaminophosphate salts of magnesium (e.g., Pigmentan® 465M), magnesium carbonate, and magnesium hydroxide. Magnesium metal is suitably employed in the form of particles, for example in the form of powder, flakes, spheres or spheroids. It should be noted that magnesium metal and magnesium metal alloy particles require specific stabilizing agents when used in aqueous coating compositions. Such stabilizing agents are generally known and commercially available. Preferably, magnesium oxide is used as the magnesium compound.

The magnesium compound or compounds are preferably present in the coating composition in an amount of 0.1-50 wt. %, more preferably 1-35 wt. %, and most preferably 5-20 wt. %, based on the dry weight of the coating composition (sum of the weights of the non-volatile components of the coating composition).

Magnesium oxide or a magnesium salt is preferably present in such amount that the weight ratio of Mg:Li is at least 0.1:1, more preferably at least 0.5:1, even more preferably at least 1:1, and still more preferably at least 3:1. This ratio is preferably less than 30:1, more preferably less than 25:1, even more preferably less than 15:1, still more preferably less than 10:1, and most preferably less than 8:1.

If a magnesium metal or alloy is present in the composition according to the disclosure, the weight ratio Mg:Li is preferably less than 500:1, more preferably less than 300:1, even more preferably less than 250:1, even more preferably less than 100:1, even more preferably less than 50:1, and most preferably less than 25:1.

Preferably, the composition contains a combination of a lithium salt, as described above, magnesium oxide and the zinc salt of DMTD. These compounds are preferably present in a weight ratio of (1-5):(1-2):1, preferably around 3:1.5:1 for the lithium salt, magnesium oxide, and the zinc salt of DMTD, respectively.

In some embodiments, the coating composition further comprises one or more additional corrosion inhibitors. The additional corrosion inhibitors can be organic or inorganic. Examples of inorganic inhibitors are phosphates such as zinc orthophosphate, zinc orthophosphate hydrate, zinc aluminium orthophosphate; polyphosphates such as strontium aluminium polyphosphate hydrate, zinc aluminium polyphosphate hydrate, magnesium aluminium polyphosphate, zinc aluminium triphosphate, and magnesium aluminium triphosphate. The inhibitors further include metal oxides such as oxides of zinc, magnesium, aluminium, lithium, molybdate, strontium, cerium, and mixtures thereof; metals like metallic Zn, metallic Mg, and Mg alloys. Examples of organic inhibitors are thiol compounds and azoles like imidazoles, thiazoles, tetrazoles, triazoles like (substituted) benzotriazole, and 2-mercaptobenzothiazole.

In some embodiments, the addition corrosion inhibitor is a thiol compound or an azole other than 2,5-dimercapto-1,3,4-thiadiazole zinc salt (VII). Azoles are 5-membered N-heterocyclic compounds containing a nitrogen atom and at least one other non-carbon atom (i.e., nitrogen, sulfur or oxygen) as part of the ring. Examples of suitable compounds include 5-methyl benzotriazole and 2-mercaptobenzothiazole (2-MBT). Preferably, 2-MBT is present as an additional corrosion inhibitor.

Other compounds that may be present in the coating composition according to the present disclosure are colour pigments (e.g. titanium dioxide or iron oxide yellow), extenders (e.g. talcum, barium sulphate, mica, calcium carbonate, silica, or wollastonite), rheology modifiers (e.g. bentone SD 2 or organic rheology modifiers), flow and levelling agents (e.g. polysiloxanes and polyacrylate levelling additives), and solvents (e.g. ketones such as methyl isobutyl ketone, aromatics such as xylene, alcohols such as benzyl alcohol, esters such as butyl acetate, and aliphatic solvents).

In a preferred embodiment, the coating composition according to the present disclosure is a liquid coating composition. The composition may comprise a volatile liquid diluent, such as a volatile organic solvent or water. The composition may be waterborne, solventborne, or solvent-free. The term "solvent-free" is defined as containing a total volatile liquid diluent content, including water and organic solvent, of less than 5 wt. %. The term "waterborne" is defined as containing at least 50 wt. % of water of the total weight of the volatile liquid diluent (including both water and organic solvents). The coating composition is preferably solventborne, which means containing organic solvent(s) in an amount of at least 50 wt. % of the total weight of volatile liquid diluent (including both water and organic solvents), more preferably at least 80 wt. %, yet more preferably at least 95 wt. % organic solvents.

In some embodiments, the coating composition is substantially water-free (non-aqueous), meaning that the water content is less than 1 wt. %, preferably less than 0.1 wt. %, based on the total weight of the coating composition. More preferably, the coating composition is water-free (non-aqueous), meaning it does not contain any water.

The coating composition according to the present disclosure is preferably a low temperature curable composition, which means that it is curable, i.e., can form a network, at a temperature below 120° C., preferably below 100° C., more preferably below 80° C., even more preferably below 50° C., and most preferably at ambient conditions (25° C.). In other embodiments, the coating composition is a high temperature curable composition, e.g., curable at temperatures of 120° C. and higher, preferably 140° C. and higher.

The non-volatile content of the coating composition is preferably 10-95 wt. %, more preferably 25-75 wt. %, and even more preferably 30-70 wt. %.

The Volatile Organic Content (VOC) of the coating composition (determined according to ASTM D3960) is preferably less than 700 g/L, such as less than 500 g/L, more preferably less than 300 g/L. The disclosure is particularly advantageous when applied in high solids systems, e.g., non-aqueous solventborne compositions with low VOC, such as less than 350 g/l.

The coating composition can be advantageously used as an anti-corrosive primer to coat non-ferrous metal substrates, such as magnesium, magnesium alloys, titanium, aluminium, aluminium alloys, and aluminium lithium alloy substrates. A preferred non-ferrous metal substrate is aluminium alloy. Examples of suitable aluminium alloys are 2024-T3 (bare or clad), 7075-T6 (bare or clad), 2098, 2099, 2198, 6061, 6111, 6022, 5052, 5083, 5251, 5454, 7475, 7017, and 7020.

The coating composition according to the present disclosure is also suitable to coat ferrous substrates. Examples of suitable ferrous substrates are cold and hot rolled steel, Stainless 304, B952 (zinc phosphate-modified), B1000 (iron phosphate-modified), and zinc-modified steel such as EZG 60G, EZG 60G with zinc phosphate modification, G90, and Galvanneal HIA Zn/Fe A45.

The coating composition according to the disclosure can be used as a primer, a bonding primer, a self-priming topcoat, an intermediate coat and/or a topcoat. It can be used in a coating system wherein at least two layers have the composition as described in the present disclosure.

The coating composition may be applied to the substrate with and without the use of a hexavalent chromium-free pre-treatment, such as a sol-gel system such as AC-®131 (AC Tech) or PreKote® (Pantheon Chemical), or a chemical conversion coating.

The coating composition can also be applied to anodized surfaces, such as chromic acid anodized (CAA) surfaces, tartaric sulphuric acid anodized (TSA) surfaces, sulphuric acid anodized (SAA) surfaces, phosphoric acid anodized (PAA) surfaces, phosphoric sulphuric acid anodized (PSA) surfaces and boric sulphuric acid anodized (BSAA) surfaces.

The coating composition can advantageously be used as a primer coating for non-ferrous metal substrates. It can be applied as a single layer or in multiple layers. In a preferred embodiment, the coating composition is applied to a substrate to form at least one primer layer in a multilayer coating system. A topcoat layer applied over the primer layer(s) may be a clear coat or a pigmented topcoat. Alternatively, the coating system can also comprise a colour and/or effect imparting basecoat applied on the primer layer and a clearcoat applied on top of the basecoat. The composition can also be used as a topcoat, which can be either clear or pigmented.

The present disclosure also relates to a multi-layer coating system comprising at least one layer obtained from the coating composition according to the first aspect of the disclosure, i.e., comprising resin system a), lithium salt b) and zinc salt c). After application, ingredients a), b) and c) are present within a single layer. Preferably, the layer formed from the coating composition is used as a primer layer applied to a substrate, which substrate is optionally pre-treated. The topcoat may be clear coat or a pigmented topcoat, or when the topcoat comprises a colour and/or effect imparting base coat applied on the primer layer, a clear coat is applied on top of the base coat layer.

The present disclosure further provides a method for coating a metal substrate comprising the steps of: a) applying the coating composition according to the first aspect of the disclosure to the metal substrate, and b) curing the applied coating composition. Any suitable method of coating application can be used, e.g., spraying, roller coating, etc. Curing can be done at ambient conditions (i.e., 25° C.) or alternatively at an elevated temperature, e.g., at 60-120° C. A skilled person is aware of suitable conditions for curing of the coating composition.

The present disclosure further provides a metal substrate coated with the coating composition according to the first aspect of the disclosure. The metal substrate may be a non-ferrous metal substrate, such as aluminium or an aluminium alloy. Alternatively, the metal substrate may be a ferrous metal substrate. The substrate may be intended for exterior or interior use. Examples include structural parts of an aircraft, parts of an aircraft cabin or a vehicle.

The coating composition is especially suitable for use in the aerospace, automotive or coil coating industry.

EXAMPLES

Chemicals Used
ZnO—Zinc white Harzsiegel® from James M. Brown Ltd
DMTD—2,5-dimercapto-1,3,4-thiadiazole from Chemical Point Ltd.
poly-EMA—poly(ethylene-alt-maleic anhydride from Sigma-Aldrich, average molecular weight about 400.000
Cymel 350—highly methylated melamine resin consisting of commercial versions of hexamethoxymethylmelamine (HMMM) from Allnex
Epikote 828—a medium viscosity liquid epoxy resin produced from bisphenol A resin and epichlorohydrin, from Hexion Europe BV
Solsperse 32500—a polymeric dispersant in n-butyl acetate from Lubrizol Corp.
M-P-A 2000X—a rheological additive from Elementis
BYK 358N—a polyacrylate-based surface additive from BYK (member of Altana Group)
Actiron NX3—2,4,6-tris(dimethyl aminomethyl)phenol, a catalyst for epoxy coatings from Protex
Ancamine 2500—an aliphatic amine-based curing agent from Evonik Industries
Dynasylan DAMO—N-2-aminoethyl-3-aminopropyltrimethoxysilane from Evonik Industries
Dynasylan Glymo—bifunctional 3-glycidyloxypropyltrimethoxysilane from Evonik Industries
DABCO—1,4-diazabicyclo[2.2.2]octane from Evonik Industries
TEOS—tetraethoxy orthosilicate, grade 98%, from Sigma Aldrich
Lithium carbonate—ACS reagent, ≥99.0%, from Sigma Aldrich
Lithium oxalate, lithium phosphate, MgO, $NH_4Cl$—all from Sigma Aldrich
Desmophen 650 MPA—branched, hydroxyl-bearing polyester from Covestro AG, 65 wt. % in 1-methoxypropylacetate-2 (MPA), 5.3% OH content
Tioxide TR92—titanium dioxide from Huntsman
$Zn(DMTD)_2$—as prepared according to Example 1 of WO 02/092880 A1
Airwhite AW 15—barium sulphate from Sibelco Specialty Minerals
Desmodur N-75 MPA/X—aliphatic polyisocyanate resin based on hexamethylene diisocyanate (HDI) and dissolved in n-butyl acetate and xylene (1:1) from Covestro AG, solids content 75 wt. %, NCO content 16.5%
Silquest A-187—epoxy-functional silane from Momentive Performance Materials
Hybricor 204—$Zn(DMTD)_2$ containing pigment from WPC Technologies Preparation of Test Panels Unless otherwise specifically described, test panels were 7.0 cm×7 cm (3×6-inch) and 0.8 mm thick, AA2024-T3 bare aluminum alloy, anodized in tartaric sulfuric acid (TSA) according to aerospace requirements (AIPI 02-01-003).

The coatings were applied with a high volume low pressure (HVLP) spray gun at ambient conditions (23° C., 55% RH). After the application and a 1 hour flash-off period, the coated panels were cured at 80° C. for 1 hour and left to dry under ambient conditions for 7 days. The dry film thickness of the coatings after drying was 20-25 μm. The coated panels were scribed (cross scribe 2 cm×2 cm) with a mechanical milling device leaving a U-shaped scribe of 1 mm wide and 100-150 μm deep (cross scribe 2 cm×2 cm). After scribing, the samples were exposed to the neutral salt spray test (ASTM-B117) for 168 h.

Electrochemical Impedance Spectroscopy (EIS)

The barrier properties of the protective layer in the defect area were quantified and evaluated using electrochemical impedance spectroscopy (EIS) as described in Visser, P., Liu, Y., Terryn, H. et al. "Lithium salts as leachable corrosion inhibitors and potential replacement for hexavalent chromium in organic coatings for the protection of aluminum alloys." *J Coat Technol Res* 13, 557-566 (2016).

The EIS measurements were performed at the open circuit potential (OCP) using a computer-controlled potentiostat over a frequency range from 0.01 Hz to 30000 Hz, measuring 7 points per decade and applying a sinusoidal amplitude of 10 mV. The measurements were executed using a three-electrode set-up in a Faraday cage, equipped with a saturated calomel electrode (SCE) as the reference electrode, platinum gauze as the counter electrode and the scribed panel as the working electrode using a 0.05 M NaCl electrolyte. The area exposed to the electrolyte was 12.5 cm$^2$, the effective bare electrode (i.e., the coating defect) area was 0.48 cm$^2$ and the volume of electrolyte was 60 cm$^3$. Measurements were recorded after 2 hours exposure to the 0.05 M NaCl electrolyte on at least three samples.

The results of the examples are displayed in the form of a table with the Zmod values at 10 mHz and at 10 Hz. The higher the impedance values, the more reinforced the protective layer is.

Viscosity Measurement

The viscosity of mixed coating compositions was measured using ISO-#4 flow-cups according to the standard method ISO 2431-19. In this method viscosity is measured in seconds during which a cup with a defined aperture empties. The sample was stirred while avoiding the formation of air bubbles. The orifice of the flow-cup was closed with a finger and the cup was filled until the sample flows over the rim. The excess of paint was skimmed by sliding a glass plate over the rim. A container was placed under the flow cup. The time measurement was started simultaneously when the finger was removed from the orifice. As soon as the first break of the stream occurred close to the orifice, the time measurement was stopped, and the flow time was recorded to the nearest 0.5 s. This was done up to 2 hours after mixing the coating composition components.

Example 1—Preparation of Zn(DMTD)$_2$

The procedure was adapted from Example 1 of WO 02/092880 A1 to fit into a 2 liter 3-neck flask. 62 g of ZnO (0.76 mol) were mixed with 222 g of demineralized water and heated at 60° C. for 1 hour in a glass 3-neck flask of 2 liter. At the same time, 222 g of DMTD (1.48 mol) were mixed with 1480 g of demineralized water. The DMTD/water mixture was added to the ZnO/water in 4 parts, preventing the temperature from dropping too much. After everything was mixed, the reaction was carried out for 2 hours at 60° C. After finishing the reaction, the stirrer was stopped, and the material was left to cool. After decanting and increasing the solid content to >20%, the aggregate particle size was reduced by bead milling (using ECM Dynomill Multi Lab of WAB) using ceramic beads of 0.5 mm. The slurry was passed through the mill until virtually no particles were left with a particle size >20 μm. The particle size was determined by laser diffraction (Malvern Mastersizer 2000). The final slurry had doo of ~4 microns. The solid content was 16 wt. %.

Example 2—Preparation of MF-Modified Zn(DMTD)$_2$

MF 1:1406 g of the slurry obtained in Example 1 was used for the MF-modification. 90 g poly(ethylene-alt-maleic anhydride) (poly-EMA, average molecular weight about 400.000) powder was mixed with 1410 ml demi-water, shaken for three days, then standing still. 375 grams of that mixture was mixed with 1.7 g NH$_4$Cl for 1 hour. This equals to 22.5 g poly-EMA, which is 10% on solid Zn(DMTD)$_2$. The Zn(DMTD)$_2$ slurry and EMA/water/NH$_4$Cl mixture were added to a 2000 ml 3-neck flask and heated to 55° C. The pH of the emulsion was 3.0 measured at 55° C. To this system a solution of 45 g Cymel 350 (20% on solid Zn(DMTD)$_2$) with 55 g demineralized water was added. The pH of the slurry is adjusted with 10 v/v % H$_2$SO$_4$ to 2.3 at 55° C. After 3.33 hours, the heat is turned off and the mixture is stirred overnight without heating. The next morning, the agitation is stopped. After centrifuging once and drying, the dried material was recovered.

The product was washed to remove the surfactant according to the following method. The material was centrifuged at 2500/3000 rpm in a Heraeus Varifuge F for 10 minutes, after which the upper phase was removed. Water was added, the material was homogenized and again centrifuged. This was repeated until the material was centrifuged four times. Water was removed and the material was dried in a vacuum furnace. Afterwards, the material was ground with pestle and mortar.

MF 2 and MF 3: The above-described method was repeated by using different amounts of surfactant poly-EMA and Cymel 350. Also, the material was not washed because the low amounts of surfactant, which did not negatively influence the viscosity tests. The differences in procedures MF mod 1, mod 2 and mod 3 are summarized in Table 1 below.

TABLE 1

| No. | Poly-EMA/ Zn(DMTD)2 | % Cymel 350/ Zn(DMTD)2 | Starting pH adjustment | Wash |
|---|---|---|---|---|
| MF 1 | 10% | 20% | 2.3 | Yes |
| MF 2 | 1% | 12.5% | 2.3 | No |
| MF 3 | 2.5% | 20% | 2.3 | No |

Example 3—Coating Compositions

Formulations 1-1 to 1-3 were prepared with the ingredients listed in Table 2. The content of ingredients is indicated by weight parts (g). The formulations were prepared according to the method described above. The formulations have 30% PVC and 350 g/L VOC.

TABLE 2

| | 1-1* Li only | 1-2* Li + Zn(DTMD)$_2$ | 1-3 Li + MF-modified Zn(DMTD)$_2$ |
|---|---|---|---|
| Component A | | | |
| 2-Heptanone | 19.18 | 19.18 | 19.18 |
| Methyl ethyl ketone | 11.34 | 11.34 | 11.34 |
| Epikote 828 | 64.60 | 64.60 | 64.60 |
| Solsperse 32500 | 4.90 | 4.90 | 4.90 |
| M-P-A 2000X | 2.01 | 2.01 | 2.01 |
| BYK 358N | 0.62 | 0.62 | 0.62 |
| Magnesium oxide | 48.60 | 48.60 | 48.60 |
| Titanium dioxide | 27.59 | 27.59 | 27.59 |
| Barium sulphate | 44.17 | 22.43 | 22.43 |
| Lithium carbonate | 18.06 | 18.06 | 18.06 |
| Zn(DMTD)$_2$ | — | 10.15 | — |
| MF 1: MF modified Zn(DMTD)$_2$ | — | — | 10.15 |
| Component B | | | |
| Xylene | 6.72 | 6.72 | 6.72 |
| Benzyl alcohol | 5.34 | 5.34 | 5.34 |
| Actiron NX3 | 2.24 | 2.24 | 2.24 |
| Ancamine 2500 | 37.22 | 37.22 | 37.22 |
| Dynasilan DAMO | 5.43 | 5.43 | 5.43 |
| Component C | | | |
| Methyl ethyl ketone | 17.36 | 17.36 | 17.36 |

*comparative examples

Formulations 1-1 and 1-2 are comparative formulations, while formulation 1-3 is according to the disclosure.

The pot life of the coating compositions was assessed by measuring flow cup viscosity development in time. The results are shown in FIG. 1.

It can be seen that the sample containing unmodified $Zn(DMTD)_2$ develops a high viscosity from the beginning, presumably because of the reaction of $Zn(DTMD)_2$ with the coating components. However, when $Zn(DTMD)_2$ is encapsulated in a polymer layer of melamine-formaldehyde, the viscosity stays low and comparable to that of the sample without $Zn(DMTD)_2$.

Formulations 1-1 to 1-3 were applied on Al 2024 T3 panels as described in the preparation of panels and subjected to the testing as described in the methods used. The results of EIS measurements are listed in Table 3.

TABLE 3

|  | 1-1* | 1-2* | 1-3 |
|---|---|---|---|
| EIS results |  |  |  |
| Zmod at 10 mHz (kΩ) | 162.5 | 500 | 425 |
| Zmod at 10 Hz (kΩ) | 1.9 | 3.7 | 4.4 |

The results of Table 3 show that the synergetic effect between the Li salt and $Zn(DMTD)_2$ is preserved, when $Zn(DMTD)_2$ is encapsulated.

Example 4—Encapsulation with Alternative Polymers

Encapsulation with a Silane

A $Zn(DMTD)_2$ containing pigment (Hybricor 204, ex WPC Technologies) was encapsulated with a silane according to the following process. 75 g of Hybricor 204 were added to 87 g methylamylketone. Following this, 0.83 g Dynasylan Glymo and 0.015 g DABCO were added to the mixture. The mixture was heated under stirring to 40° C. for 3 hours, after which 21 g tetraethoxy orthosilicate (TEOS) was added with 0.4 g NaOH 0.1M. The mixture was stirred with a glass stirrer at 40° C. for 6 hours, yielding a silane-encapsulated $Zn(DMTD)_2$ containing pigment (55% solids in MEK).

Encapsulation with an Acrylic Polymer

Encapsulation of $Zn(DMTD)_2$ with an acrylic polymer was done according to a proprietary method similar to the one described in Example 1 of EP0477433 B1. For the sample "Acrylic modified 1" 11.5 wt. % polyacrylate polymer on $Zn(DMTD)_2$ solids was used, and for the sample "Acrylic modified 2" 9.7 wt. % polyacrylate polymer on $Zn(DMTD)_2$ was used.

Coating compositions were prepared in the same way as formulation 1-3 in Example 3 but using differently encapsulated pigment instead of MF 1. The viscosity of the coating composition after mixing was followed in time as described above.

Figure 2:
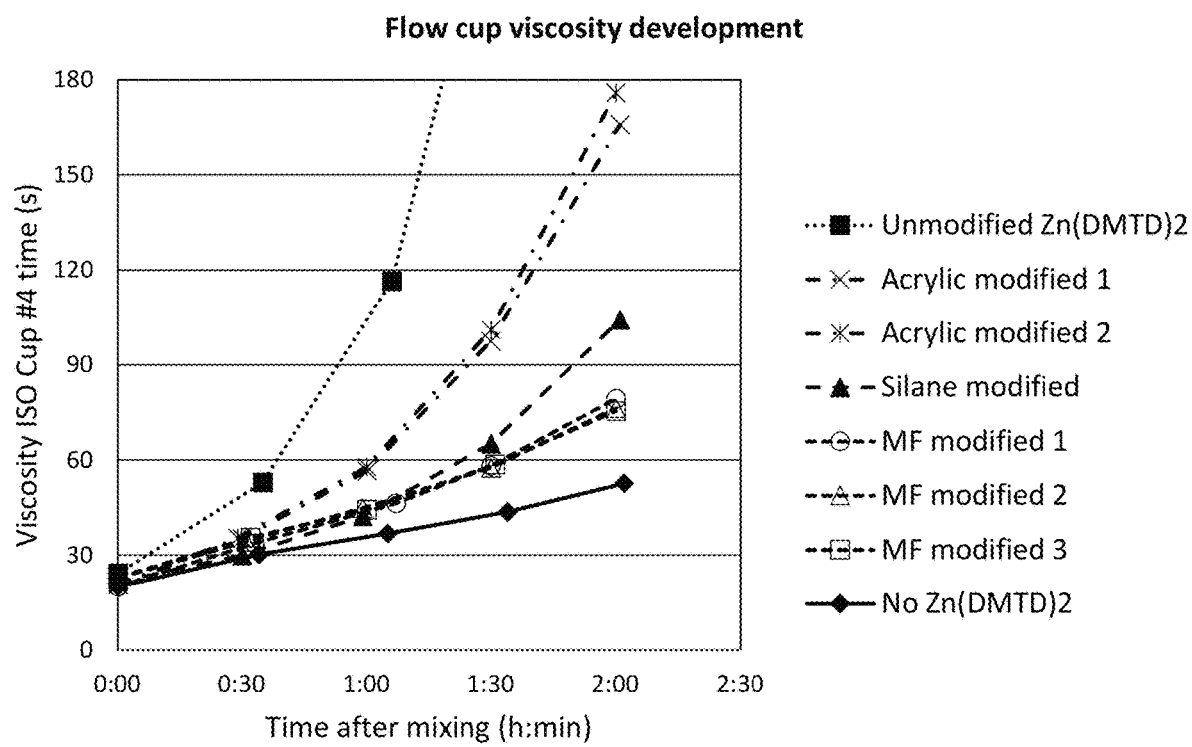

The results of the viscosity measurements are shown in FIG. 2.

It can be concluded that encapsulation with melamine-formaldehyde (MF) and silane offer the best encapsulation.

The synergy effect between a lithium salt and a zinc salt of DMTD is further illustrated in Comparative Examples 1-7, which are all comparative because a non-encapsulated version of a zinc salt of DMTD is used.

Comparative Example 1—Synergy Between Li Salt and $Zn(DTMD)_2$

Formulations C1-1 to C1-4 were prepared with the ingredients listed in Table 4. The content of ingredients is indicated by weight parts (g). Also, the content of active ingredients Li and DMTD is indicated as wt. % on resin system solids.

The raw materials of Component A were added sequentially while stirring into a 370 ml glass jar. Subsequently, 400 grams Zirconox pearls (1.7-2.4 mm) were added to the mixture for grinding and dispersion of the pigments. The samples were shaken for 20 minutes on a Skandex paint shaker to achieve a fineness of grind less than 25 μm. After shaking the pearls were separated from the coating. Component B was prepared separately by mixing.

Component B was added to component A under stirring to ensure sufficient mixing to obtain homogeneous samples. The coatings were allowed to induce for 30 minutes after mixing of the separate components.

The results of EIS measurements are also listed in Table 4.

TABLE 4

|  | C1-1 | C1-2 | C1-3 | C1-4 |
|---|---|---|---|---|
| Component A |  |  |  |  |
| Methyl isobutyl ketone | 60 | 60.0 | 60.0 | 60.0 |
| Desmophen 650 MPA | 47.7 | 47.7 | 47.7 | 47.7 |
| Lithium carbonate | — | — | 12.0 | 10.0 |
| Tioxide TR92 | 19.9 | 19.9 | 19.9 | 19.9 |
| $Zn(DMTD)_2$ | — | 6.0 | — | 6.0 |
| Airwhite AW 15 | 47.3 | 34.0 | 21.2 | 14.0 |
| Magnesium oxide | 26.6 | 19.0 | 19.0 | 19.0 |
| Component B |  |  |  |  |
| Desmodur N 75 MPA/X | 28.5 | 28.5 | 28.5 | 28.5 |
| Silquest A-187 | 5.2 | 5.2 | 5.2 | 5.2 |
| Methyl isobutyl ketone | 50.0 | 50.0 | 50.0 | 50.0 |
| Active ingredients, wt. % on resin system solids |  |  |  |  |
| Li | — | — | 4.4 | 3.6 |
| DMTD | — | 9.5 | — | 9.5 |
| EIS results |  |  |  |  |
| Zmod at 10 mHz (kΩ) | 27 | 31 | 180 | 821 |
| Zmod at 10 Hz (kΩ) | 0.5 | 0.7 | 2.5 | 6 |

It can be seen that the coating with both $Zn(DMTD)_2$ and a Li salt (C1-4) shows a significantly higher impedance |Z| (also referred to as "Zmod") values than the formulations without any of the active components (C1-1), or with $Zn(DMTD)_2$ alone (C1-2) or with the Li salt alone (C1-3). This effect is much stronger than the sum of individual effects for a Li salt (C1-3) and $Zn(DMTD)_2$ (C1-2) and is hence a synergistic effect.

The results also show that $Zn(DMTD)_2$ alone (C1-2) has no effect on the formation of a protective layer in the defect area. Particularly, coating C1-2 has as low impedance values as those of the coating without (Negative Reference) (C1-1).

Comparative Example 2—Comparison with Other Azoles

Formulations C2-1 to C2-7 were prepared in the same manner as in Comparative Example 1 but with the ingredients as indicated in Table 5. The content of ingredients is indicated by weight parts (g). The content of active ingredients is also indicated in wt. % on resin system solids. Molar amounts of the azoles are the same across all the formulations of this example. BTA is benzotriazole, 2-MBT is 2-mercaptobenzothiazole. The results of EIS measurements are also listed in Table 5.

TABLE 5

| | C2-1 | C2-2 | C2-3 | C2-4 | C2-5 | C2-6 | C2-7 |
|---|---|---|---|---|---|---|---|
| Component A | | | | | | | |
| Methyl isobutyl ketone | 60.0 | 60.0 | 60.0 | 60.0 | 60.0 | 60.0 | 60.0 |
| Desmophen 650 MPA | 47.7 | 47.7 | 47.7 | 47.7 | 47.7 | 47.7 | 47.7 |
| Lithium carbonate | — | — | — | 12.0 | 10.0 | 10.0 | 10.0 |
| Tioxide TR92 | 19.9 | 19.9 | 19.9 | 19.9 | 19.9 | 19.9 | 19.9 |
| $Zn(DMTD)_2$ | — | — | — | — | — | — | 6.0 |
| Airwhite AW 15 | 47.3 | 35.0 | 31.0 | 21.2 | 13.5 | 9.7 | 14.0 |
| Magnesium oxide | 26.6 | 19.0 | 19.0 | 19.0 | 19.0 | 19.0 | 19.0 |
| BTA | — | 3.6 | — | — | 3.6 | — | — |
| 2-MBT | — | — | 5.0 | — | — | 5.0 | — |
| Component B | | | | | | | |
| Desmodur N 75 MPA/X | 28.5 | 28.5 | 28.5 | 28.5 | 28.5 | 28.5 | 28.5 |
| Silquest A-187 | 5.2 | 5.2 | 5.2 | 5.2 | 5.2 | 5.2 | 5.2 |
| Methyl isobutyl ketone | 50.0 | 50.0 | 50.0 | 50.0 | 50.0 | 50.0 | 50.0 |
| Active ingredients, wt. % on resin system solids | | | | | | | |
| Li | — | — | — | 4.4 | 3.6 | 3.6 | 3.6 |
| DMTD | — | — | — | — | — | — | 9.5 |
| BTA | — | 6.9 | — | — | 6.9 | — | — |
| 2-MBT | — | — | 9.6 | — | — | 9.6 | — |
| EIS results | | | | | | | |
| Zmod at 10 mHz (kΩ) | 56 | 51 | 33 | 95 | 103 | 81 | 1030 |
| Zmod at 10 Hz (kΩ) | 1.2 | 0.7 | 0.9 | 2.4 | 1.9 | 2.4 | 5.6 |

The results show that combination of a Li salt with other azoles (BTA or 2-MBT) do not have the same synergistic effect as the combination with $Zn(DMTD)_2$. The combination of a Li salt and $Zn(DMTD)_2$ provides much higher impedance values related to the reinforcement of the protective layer in the defect area, indicating better reinforcement of the protective layer in the defect area.

Comparative Example 3—Different Concentrations of Li Salt

Formulations C3-1 to C3-8 were prepared in the same manner as in Comparative Example 1 but with the ingredients as in Table 6. The content of ingredients is indicated by weight parts (g). The amount of active ingredients is also given in wt. % on resin system solids. The results of EIS measurements are also listed in Table 6. In these experiments, the formulation comprises a Li salt and $Zn(DTMD)_2$, wherein the concentration of the Li salt is varied.

TABLE 6

| | C3-1 | C3-2 | C3-3 | C3-4 | C3-5 | C3-6 | C3-7 | C3-8 |
|---|---|---|---|---|---|---|---|---|
| Component A | | | | | | | | |
| Methyl isobutyl ketone | 60.0 | 60.0 | 60.0 | 60.0 | 60.0 | 60.0 | 60.0 | 60.0 |
| Desmophen 650 MPA | 47.7 | 47.7 | 47.7 | 47.7 | 47.7 | 47.7 | 47.7 | 47.7 |
| Lithium Carbonate | — | 12.0 | — | 0.7 | 1.4 | 3.6 | 7.1 | 10.0 |
| Tioxide TR92 | 19.9 | 19.9 | 19.9 | 19.9 | 19.9 | 19.9 | 19.9 | 19.9 |
| $Zn(DMTD)_2$ | — | — | 6.0 | 6.0 | 6.0 | 6.0 | 6.0 | 6.0 |
| Airwhite AW 15 | 47.3 | 21.2 | 34.0 | 33.0 | 31.5 | 27.0 | 19.0 | 14.0 |
| Magnesium oxide | 26.6 | 19.0 | 19.0 | 19.0 | 19.0 | 19.0 | 19.0 | 19.0 |
| Component B | | | | | | | | |
| Desmodur N 75 MPA/X | 28.5 | 28.5 | 28.5 | 28.5 | 28.5 | 28.5 | 28.5 | 28.5 |
| Silquest A-187 | 5.2 | 5.2 | 5.2 | 5.2 | 5.2 | 5.2 | 5.2 | 5.2 |
| Methyl isobutyl ketone | 50.0 | 50.0 | 50.0 | 50.0 | 50.0 | 50.0 | 50.0 | 50.0 |
| Active ingredients, wt. % on resin system solids | | | | | | | | |
| Lithium carbonate | — | 23.0 | — | 1.4 | 2.7 | 6.8 | 13.6 | 19.0 |
| $Zn(DMTD)_2$ | — | — | 11.5 | 11.5 | 11.5 | 11.5 | 11.5 | 11.5 |
| Li | — | 4.4 | — | 0.3 | 0.5 | 1.3 | 2.6 | 3.6 |
| DMTD | — | — | 9.4 | 9.4 | 9.4 | 9.4 | 9.4 | 9.4 |
| EIS results | | | | | | | | |
| Zmod at 10 mHz (kΩ) | 39 | 110 | 30 | 47 | 77 | 355 | 390 | 410 |
| Zmod at 10 Hz (kΩ) | 0.6 | 2.1 | 0.4 | 0.6 | 1.04 | 2.1 | 2.5 | 2.7 |

It can be seen that significantly higher impedance values are obtained for the compositions containing at least 1.3 wt. % Li on resin system solids in combination with $Zn(DMTD)_2$ compared to the sample with only a Li-salt.

Comparative Example 4—Different Concentration of $Zn(DMTD)_2$

Formulations C4-1 to C4-8 were prepared in the same manner as in Comparative Example 1 but with the ingredients as in Table 7. The content of ingredients is indicated by weight parts (g). The amount of active ingredients is also given in wt. % on resin system solids. The results of EIS measurements are also listed in Table 7. In these experiments, the active material comprises a Li salt and $Zn(DTMD)_2$, wherein the concentration of $Zn(DTMD)_2$ is varied.

TABLE 7

|  | C4-1 | C4-2 | C4-3 | C4-4 | C4-5 | C4-6 | C4-7 | C4-8 |
|---|---|---|---|---|---|---|---|---|
| Component A |  |  |  |  |  |  |  |  |
| Methyl isobutyl ketone | 60.0 | 60.0 | 60.0 | 60.0 | 60.0 | 60.0 | 60.0 | 60.0 |
| Desmophen 650 MPA | 47.7 | 47.7 | 47.7 | 47.7 | 47.7 | 47.7 | 47.7 | 47.7 |
| Lithium Carbonate | — | 12.0 | — | 12.0 | 12.0 | 12.0 | 12.0 | 12.0 |
| Tioxide TR92 | 19.9 | 19.9 | 19.9 | 19.9 | 19.9 | 19.9 | 19.9 | 19.9 |
| $Zn(DMTD)_2$ | — | — | 6.0 | 0.4 | 0.7 | 1.4 | 2.8 | 4.2 |
| Airwhite AW 15 | 47.3 | 21.2 | 34.0 | 33.0 | 31.5 | 27.0 | 19.0 | 14.0 |
| Magnesium oxide | 26.6 | 19.0 | 19.0 | 19.0 | 19.0 | 19.0 | 19.0 | 19.0 |
| Component B |  |  |  |  |  |  |  |  |
| Desmodur N 75 MPA/X | 28.5 | 28.5 | 28.5 | 28.5 | 28.5 | 28.5 | 28.5 | 28.5 |
| Silquest A-187 | 5.2 | 5.2 | 5.2 | 5.2 | 5.2 | 5.2 | 5.2 | 5.2 |
| Methyl isobutyl ketone | 50.0 | 50.0 | 50.0 | 50.0 | 50.0 | 50.0 | 50.0 | 50.0 |
| Active ingredients, wt. % on resin system solids |  |  |  |  |  |  |  |  |
| Lithium carbonate | — | 23 | — | 23 | 23 | 23 | 23 | 23 |
| $Zn(DMTD)_2$ | — | — | 11.5 | 0.7 | 1.4 | 2.8 | 5.5 | 8.2 |
| Li | — | 4.4 | — | 4.4 | 4.4 | 4.4 | 4.4 | 4.4 |
| DMTD | — | — | 9.4 | 0.6 | 1.2 | 2.3 | 4.5 | 6.7 |
| EIS results |  |  |  |  |  |  |  |  |
| Zmod at 10 mHz (kΩ) | 39 | 110 | 30 | 367 | 454 | 300 | 320 | 430 |
| Zmod at 10 Hz (kΩ) | 0.6 | 2.1 | 0.4 | 1.9 | 1.9 | 2.2 | 2.4 | 2.5 |

It can be concluded that $Zn(DTMD)_2$ shows synergistic effect with the Li salt in any amount, even in very small amounts of DMTD such as 0.6 wt. %. Even at these low concentrations of DMTD, there is a clear improvement of the barrier properties of the protective layer (reinforcement effect) in the defect area.

Comparative Example 5—Different Li Salts (4.4% Li)

Formulations C5-1 to C5-8 were prepared in the same manner as in Comparative Example 1 but with the ingredients as in Table 8. The content of ingredients is indicated by weight parts (g). The amount of the active ingredients is also given in wt. % on resin system solids. The results of EIS measurements are also listed in Table 8. In these experiments, the coatings comprise different soluble Li salts, with Li content 4.4 wt. % on resin system solids. The lithium salts have been selected on their different solubilities.

TABLE 8

|  | C5-1 | C5-2 | C5-3 | C5-4 | C5-5 | C5-6 | C5-7 | C5-8 |
|---|---|---|---|---|---|---|---|---|
| Component A |  |  |  |  |  |  |  |  |
| Methyl isobutyl ketone | 60.0 | 60.0 | 60.0 | 60.0 | 60.0 | 60.0 | 60.0 | 60.0 |
| Desmophen 650 MPA | 47.7 | 47.7 | 47.7 | 47.7 | 47.7 | 47.7 | 47.7 | 47.7 |
| Lithium carbonate | — | — | 12.0 | — | — | 12.0 | — | — |
| Lithium phosphate | — | — | — | 12.8 | — | — | 12.8 | — |

TABLE 8-continued

|  | C5-1 | C5-2 | C5-3 | C5-4 | C5-5 | C5-6 | C5-7 | C5-8 |
|---|---|---|---|---|---|---|---|---|
| Lithium oxalate | — | — | — | — | 16.9 | — | — | 16.9 |
| Tioxide TR92 | 19.9 | 19.9 | 19.9 | 19.9 | 19.9 | 19.9 | 19.9 | 19.9 |
| Magnesium oxide | 19.0 | 19.0 | 19.0 | 19.0 | 19.0 | 19.0 | 19.0 | 19.0 |
| Barium sulphate | 46.8 | 33.9 | 20.5 | 24.1 | 10.9 | 7.6 | 11.2 | 0.0 |
| $Zn(DMTD)_2$ | — | 6.0 | — | — | — | 6.0 | 6.0 | 6.0 |
| Component B |  |  |  |  |  |  |  |  |
| Desmodur N 75 MPA/X | 28.5 | 28.5 | 28.5 | 28.5 | 28.5 | 28.5 | 28.5 | 28.5 |
| Silquest A-187 | 5.2 | 5.2 | 5.2 | 5.2 | 5.2 | 5.2 | 5.2 | 5.2 |
| Methyl isobutyl ketone | 50.0 | 50.0 | 50.0 | 50.0 | 50.0 | 50.0 | 50.0 | 50.0 |
| Active ingredients, wt. % on resin system solids |  |  |  |  |  |  |  |  |
| Lithium carbonate | — | — | 23.0 | — | — | 23.0 | — | — |
| Lithium phosphate | — | — | — | 24.6 | — | — | 24.6 | — |
| Lithium oxalate | — | — | — | — | 32.5 | — | — | 32.5 |
| $Zn(DMTD)_2$ | — | 11.4 | — | — | — | 11.4 | 11.4 | 11.4 |
| Li | — | — | 4.4 | 4.4 | 4.4 | 4.4 | 4.4 | 4.4 |
| DMTD | — | 9.5 | — | — | — | 9.5 | 9.5 | 9.5 |
| EIS results |  |  |  |  |  |  |  |  |
| Zmod at 10 mHz (kΩ) | 48 | 60 | 110 | 120 | 166 | 953 | 150 | 784 |
| Zmod at 10 Hz (kΩ) | 0.8 | 1.0 | 2.0 | 1.9 | 2.3 | 5.3 | 2.1 | 3.8 |

It can be concluded that $Zn(DTMD)_2$ shows the reinforcement effect with the Li salt irrespective of which salt is used. Moderate effect for lithium phosphate is believed to be due to its lower solubility in water.

Comparative Example 6—Different Li Salts (1.3 wt. % Li)

Formulations C6-1 to C6-6 were prepared in the same manner as in Comparative Example 1 but with the ingredients as in Table 9. The content of ingredients is indicated by weight parts (g). The amount of active ingredients is also given in wt. % on resin system solids. The results of EIS measurements are also listed in Table 9. In these experiments, the coating comprises different soluble Li salts, with Li content 1.3 wt. % on resin system solids.

TABLE 9

|  | C6-1 | C6-2 | C6-3 | C6-4 | C6-5 | C6-6 |
|---|---|---|---|---|---|---|
| Component A |  |  |  |  |  |  |
| Methyl isobutyl ketone | 60.0 | 60.0 | 60.0 | 60.0 | 60.0 | 60.0 |
| Desmophen 650 MPA | 47.7 | 47.7 | 47.7 | 47.7 | 47.7 | 47.7 |
| Lithium carbonate | 3.6 | — | — | 3.6 | — | — |
| Lithium phosphate | — | 3.8 | — | — | 3.8 | — |
| Lithium oxalate | — | — | 5.0 | — | — | 5.0 |
| Tioxide TR92 | 19.9 | 19.9 | 19.9 | 19.9 | 19.9 | 19.9 |
| Magnesium oxide | 19.0 | 19.0 | 19.0 | 19.0 | 19.0 | 19.0 |
| Barium sulphate | 39.0 | 40.1 | 36.1 | 26.1 | 27.2 | 23.3 |
| $Zn(DMTD)_2$ | — | — | — | 6.0 | 6.0 | 6.0 |
| Component B |  |  |  |  |  |  |
| Desmodur N 75 MPA/X | 28.5 | 28.5 | 28.5 | 28.5 | 28.5 | 28.5 |
| Silquest A-187 | 5.2 | 5.2 | 5.2 | 5.2 | 5.2 | 5.2 |
| Methyl isobutyl ketone | 50.0 | 50.0 | 50.0 | 50.0 | 50.0 | 50.0 |
| Active ingredients, wt. % on resin system solids |  |  |  |  |  |  |
| Lithium carbonate | 7.0 | — | — | 7.0 | — | — |
| Lithium phosphate | — | 7.2 | — | — | 7.2 | — |
| Lithium oxalate | — | — | 9.6 | — | — | 9.6 |
| $Zn(DMTD)_2$ | — | — | — | 11.4 | 11.4 | 11.4 |

TABLE 9-continued

|  | C6-1 | C6-2 | C6-3 | C6-4 | C6-5 | C6-6 |
|---|---|---|---|---|---|---|
| Li | 1.3 | 1.3 | 1.3 | 1.3 | 1.3 | 1.3 |
| DMTD | — | — | — | 9.5 | 9.5 | 9.5 |
| EIS results |  |  |  |  |  |  |
| Zmod at 10 mHz (kΩ) | 71 | 59 | 168 | 567 | 57 | 725 |
| Zmod at 10 Hz (kΩ) | 2.0 | 0.9 | 1.6 | 3.9 | 1.0 | 3.5 |

It can be concluded that $Zn(DTMD)_2$ shows reinforcement of the protective layer with most of the Li salts, also when used in a lower amount than in Comparative Example 5, except for lithium phosphate. For lithium phosphate better results were achieved with a higher Li content (Comparative Example 5), which is believed to be due to its lower solubility in water.

Comparative Example 7—without Magnesium Oxide

Formulations C7-1 to C7-4 were prepared in the same manner as in Comparative Example 1 but with the ingredients as in Table 10. The content of ingredients is indicated by weight parts (g). The amount of active ingredients is also given in wt. % on resin system solids. The results of EIS measurements are also listed in Table 10. In these experiments, it is tested whether the reinforcement effect is also present in compositions without magnesium oxide.

TABLE 10

|  | C7-1 | C7-2 | C7-3 | C7-4 |
|---|---|---|---|---|
| Component A |  |  |  |  |
| Methyl isobutyl ketone | 60.0 | 60.0 | 60.0 | 60.0 |
| Desmophen 650 MPA | 47.7 | 47.7 | 47.7 | 47.7 |
| Lithium carbonate | — | 12.0 | — | 12.0 |
| Tioxide TR92 | 19.9 | 19.9 | 19.9 | 19.9 |
| Barium sulphate | 70.6 | 44.4 | 57.8 | 31.5 |
| $Zn(DMTD)_2$ | — | — | 6.0 | 6.0 |

TABLE 10-continued

|  | C7-1 | C7-2 | C7-3 | C7-4 |
|---|---|---|---|---|
| Component B |  |  |  |  |
| Desmodur N 75 MPA/X | 28.5 | 28.5 | 28.5 | 28.5 |
| Silquest A-187 | 5.2 | 5.2 | 5.2 | 5.2 |
| Methyl isobutyl ketone | 50.0 | 50.0 | 50.0 | 50.0 |
| Active ingredients, wt. % on resin system solids |  |  |  |  |
| Lithium carbonate | — | 23.0 | — | 19.0 |
| Zn(DMTD)$_2$ | — | — | 11.4 | 11.5 |
| Li | — | 4.4 | — | 3.6 |
| DMTD | — | — | 9.5 | 9.5 |
| EIS results |  |  |  |  |
| Zmod at 10 mHz (kΩ) | 40 | 94 | 57 | 459 |
| Zmod at 10 Hz (kΩ) | 0.6 | 1.9 | 0.8 | 4 |

It can be concluded that the reinforcement effect is also present in the absence of MgO and is purely attributed to the combination of a lithium salt and Zn(DMTD)$_2$.

Comparative Example 8—Different Concentrations of Lithium Phosphate

Formulations C8-1 to C8-6 were prepared in the same manner as in Comparative Example 1 but with the ingredients as in Table 11. The content of ingredients is indicated by weight parts (g). The amount of active ingredients is also given in wt. % on resin system solids.

In these experiments, the concentration of lithium phosphate is varied such that the Li content on resin system solids ranges from 2.0 to 7.0 wt. %.

TABLE 11

|  | C8-1 | C8-2 | C8-3 | C8-4 | C8-5 | C8-6 |
|---|---|---|---|---|---|---|
| Component A |  |  |  |  |  |  |
| Methyl isobutyl ketone | 60.0 | 60.0 | 60.0 | 60.0 | 60.0 | 60.0 |
| Desmophen 650 MPA | 47.7 | 47.7 | 47.7 | 47.7 | 47.7 | 47.7 |
| Lithium phosphate | — | — | 12.8 | 5.8 | 14.5 | 20.2 |
| Tioxide TR92 | 19.9 | 19.9 | 19.9 | 19.9 | 19.9 | 19.9 |
| Magnesium oxide | 19.0 | 19.0 | 19.0 | 19.0 | 19.0 | 19.0 |
| Barium sulphate | 47.3 | 34.0 | 26.0 | 25.0 | 10.0 | 1.0 |
| Zn(DMTD)$_2$ |  | 6.0 |  | 6.0 | 6.0 | 6.0 |
| Component B |  |  |  |  |  |  |
| Desmodur N 75 MPA/X | 28.5 | 28.5 | 28.5 | 28.5 | 28.5 | 28.5 |
| Silquest A-187 | 5.2 | 5.2 | 5.2 | 5.2 | 5.2 | 5.2 |
| Methyl isobutyl ketone | 50.0 | 50.0 | 50.0 | 50.0 | 50.0 | 50.0 |
| Active ingredients, wt. % on resin system solids |  |  |  |  |  |  |
| Lithium phosphate | — | — | 24.3 | 11.0 | 27.6 | 38.7 |
| Zn(DMTD)$_2$ | — | 11.4 | — | 11.4 | 11.4 | 11.4 |
| Li | — | — | 4.4 | 2.0 | 5.0 | 7.0 |
| DMTD | — | 9.5 | — | 9.5 | 9.5 | 9.5 |
| EIS results |  |  |  |  |  |  |
| Zmod at 10 mHz (kΩ) | 44 | 50 | 98 | 126 | 136 | 128 |
| Zmod at 10 Hz (kΩ) | 0.4 | 0.5 | 1.2 | 1.4 | 1.3 | 1.2 |

Test panels were prepared and scribed as described hereinabove. After scribing, the samples were exposed to the neutral salt spray test (ASTM-B117) for 96 hours. The results of EIS measurements are listed in Table 11.

The invention claimed is:

1. A coating composition comprising:
    a) a resin system comprising an organic film-forming resin and optionally a curing agent reactive with the organic film-forming resin,
    b) a lithium salt with a solubility in water in the range from 0.01 to 120 g/L at 20° C., selected from the group consisting of lithium carbonate, lithium phosphate, lithium bicarbonate, lithium tetraborate, and lithium oxalate, and
    c) a zinc salt of 2,5-dimercapto-1,3,4-thiadiazole (DMTD), wherein the zinc salt of DMTD is 2,5-dimercapto-1,3,4-thiadiazole zinc salt (VII),
    wherein the zinc salt of DMTD is present as solid particles, the surface of which is at least partially covered by a layer of a film-formed polymer.

2. The composition according to claim 1, wherein the organic film-forming resin is an epoxy resin.

3. The composition according to claim 1, wherein the resin system comprises a curing agent, and wherein the curing agent is selected from the group consisting of an aliphatic or aromatic amine, a polyamide and a thiol.

4. The composition according to claim 3, wherein the curing agent comprises a melamine resin.

5. The composition according to claim 1, wherein the film-formed polymer is a melamine-formaldehyde polymer.

6. The composition according to claim 1, wherein the lithium salt is present in an amount of at least 1.3 wt. % of lithium based on resin system solids.

7. The composition according to claim 1, wherein the lithium salt is selected from the group consisting of lithium carbonate, lithium bicarbonate, lithium tetraborate and lithium oxalate, preferably from the group consisting of lithium carbonate and lithium oxalate, more preferably is lithium carbonate.

8. The composition according to claim 1, wherein the lithium salt is lithium phosphate, and the lithium phosphate is present in an amount of at least 2.0 wt. % of lithium based on solid weight of the resin system.

9. The composition according to claim 1, wherein the zinc salt of DMTD is present in an amount of 0.05-50 wt. % of DMTD on solid weight of the resin system.

10. The composition according to claim 1, which is a solventborne composition.

11. A multi-layer coating system on a metal substrate, comprising a layer obtained from the coating composition according to claim 1.

12. The multi-layer coating system according to claim 11, wherein the layer obtained from the coating composition according to claim 1 is a primer layer on the metal substrate.

13. A method for coating a metal substrate comprising the steps of:
    a) applying the coating composition according to claim 1 to the metal substrate, and
    b) curing the applied coating composition.

14. A metal substrate coated with the coating composition according to claim 1.

* * * * *